United States Patent
Alrushaid et al.

(10) Patent No.: US 12,536,074 B2
(45) Date of Patent: Jan. 27, 2026

(54) SYSTEM AND METHOD FOR SECURE PROACTIVE ACTIVATION OF A DISASTER RECOVERY SYSTEM

(71) Applicant: SAUDI ARABIAN OIL COMPANY, Dhahran (SA)

(72) Inventors: Abdulaziz A Alrushaid, Khobar (SA); Reem A. Algarawi, Jubail (SA); Sarah A. Alzamil, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 9 days.

(21) Appl. No.: 18/314,595

(22) Filed: May 9, 2023

(65) Prior Publication Data
US 2024/0378116 A1 Nov. 14, 2024

(51) Int. Cl.
*G06F 11/00* (2006.01)
*G06F 11/14* (2006.01)

(52) U.S. Cl.
CPC ...... *G06F 11/1451* (2013.01); *G06F 11/1469* (2013.01)

(58) Field of Classification Search
CPC ............ G06F 11/1451; G06F 11/1469; G06F 11/0793; G06F 11/1464; G06F 11/0754; G06F 11/1446; G06F 11/3006
See application file for complete search history.

(56) References Cited

U.S. PATENT DOCUMENTS

| | | | |
|---|---|---|---|
| 8,310,918 B2 | 11/2012 | Poulson et al. | |
| 9,594,620 B2* | 3/2017 | Xia | G06F 11/3006 |
| 11,010,260 B1* | 5/2021 | Savir | G06F 11/3452 |
| 2019/0122130 A1* | 4/2019 | Basavarajappa | G06F 11/0787 |
| 2020/0159609 A1* | 5/2020 | Korotaev | G06F 11/0709 |
| 2021/0248042 A1* | 8/2021 | Sundaram | G06F 11/0754 |
| 2022/0365957 A1* | 11/2022 | Han | G06F 17/40 |
| 2024/0231754 A1* | 7/2024 | Tatiraju | G06F 7/02 |

FOREIGN PATENT DOCUMENTS

EP 3848809 A1 7/2021

* cited by examiner

*Primary Examiner* — Joseph D Manoskey
(74) *Attorney, Agent, or Firm* — Leason Ellis LLP

(57) ABSTRACT

A proactive activation system and method perform secure proactive activation of a disaster recovery system of a business. The proactive activation system comprises a log correlation system, a scoring system, and a disaster recovery activation system. The log correlation system collects logs from a computing device used in the business by a user, cross-correlates the collected logs, and determines a potential system failure as a disaster indicator. The scoring system assigns a score to the disaster indicator. In the case of the disaster indicator score being greater than a predetermined threshold, the disaster recovery activation system generates a control signal to activate the disaster recovery system. The method implements the proactive activation system.

12 Claims, 4 Drawing Sheets

SYSTEM AND METHOD FOR SECURE PROACTIVE ACTIVATION OF A DISASTER RECOVERY SYSTEM

FIELD OF THE DISCLOSURE

The present disclosure relates generally to disaster recovery systems for computing devices, and, more particularly, to a system and method configured to perform secure proactive activation of a disaster recovery system.

BACKGROUND OF THE DISCLOSURE

In the field of disaster recovery (DR), businesses can implement a disaster recovery plan (DRP) to maintain or reestablish vital infrastructure and computing systems following a natural disaster such as a storm, or human-induced disasters such as an armed conflict. Disaster recovery focuses on information technology (IT) supporting critical business functions to keep essential aspects of the business functioning despite significant disruptive events. Disaster recovery is needed when a primary business site or premise equipment are not immediately recoverable. A disaster recovery plan can include restoring data and services to a secondary business site. It is necessary for disaster recovery to guarantee business continuity and minimize downtime of users of the infrastructure.

SUMMARY OF THE DISCLOSURE

According to an embodiment consistent with the present disclosure, a system and method are configured to perform secure proactive activation of a disaster recovery system.

In an embodiment, a method comprises collecting logs from a computing device used in a business by a user, cross-correlating the collected logs, determining a potential system failure as a disaster indicator from the cross-correlated collected logs, assigning a score to the disaster indicator, and in the case of the disaster indicator score being less than or equal to a predetermined threshold, continuing the cross-correlating of the collected logs. In the case of the disaster indicator score being greater than the predetermined threshold, the method generates a control signal, transmits the control signal to a disaster recovery system, and responsive to the control signal, activates the disaster recovery system.

The computing device can be a host computing device, and the collected logs can be host logs. Alternatively, the computing device can be a network device, and the collected logs can be network logs. The activating of the disaster recovery system can include notifying a monitoring center that a disaster event is occurring. The activating of the disaster recovery system can also include performing a health check of the activated disaster recovery system. The activating of the disaster recovery system can further include collecting latest healthy system configuration backup data. The method can further include storing the collected latest healthy system configuration backup data in a memory. The activating of the disaster recovery system can further comprise enabling a connection between the computing device and the activated disaster recovery system, synchronizing the configuration backup data to the activated disaster recovery system, and migrating the user from the computing device to the activated disaster recovery system.

In an alternative embodiment, a non-volatile computer readable medium is configured to store instructions that, in the case of execution of the instructions by a processor, configures the processor to perform the steps of collecting logs from a computing device used in a business by a user, cross-correlating the collected logs, determining a potential system failure as a disaster indicator from the cross-correlated collected logs, assigning a score to the disaster indicator, and in the case of the disaster indicator score being less than or equal to a predetermined threshold, continuing the cross-correlating of the collected logs. However, in the case of the disaster indicator score being greater than the predetermined threshold, the processor performs the steps of generating a control signal, transmitting the control signal to a disaster recovery system, and responsive to the control signal, activating the disaster recovery system.

The computing device can be a host computing device, and the collected logs can be host logs. Alternatively, the computing device can be a network device, and the collected logs can be network logs. The activating of the disaster recovery system can include notifying a monitoring center that a disaster event is occurring. The activating of the disaster recovery system can also include performing a health check of the activated disaster recovery system. The activating of the disaster recovery system can further include collecting latest healthy system configuration backup data. The processor can further perform the steps of storing the collected latest healthy system configuration backup data in a memory. The activating of the disaster recovery system can further comprise enabling a connection between the computing device and the activated disaster recovery system, synchronizing the configuration backup data to the activated disaster recovery system, and migrating the user from the computing device to the activated disaster recovery system.

In a further embodiment, a proactive activation system comprises a log correlation system, a scoring system, and a disaster recovery activation system. The log correlation system is configured to collect logs from a computing device used in a business by a user, to cross-correlate the collected logs, and to determine a potential system failure as a disaster indicator from the cross-correlated collected logs. The scoring system is configured to assign a score to the disaster indicator. The disaster recovery activation system is operatively connected to a disaster recovery system, and is configured, in the case of the disaster indicator score being greater than a predetermined threshold, to generate a control signal, and to transmit the control signal to the disaster recovery system. The disaster recovery system, responsive to the control signal, is configured to activate to perform a disaster recovery plan.

The disaster recovery activation system can be operatively connected to the disaster recovery system through a network firewall. The activated disaster recovery system can be configured to collect latest healthy system configuration backup data. The activated disaster recovery system can be further configured to synchronize the configuration backup data to the activated disaster recovery system, and configured to migrate the user from the computing device to the activated disaster recovery system.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method configured to perform secure proactive activation of a disaster recovery system.

Figure 1:
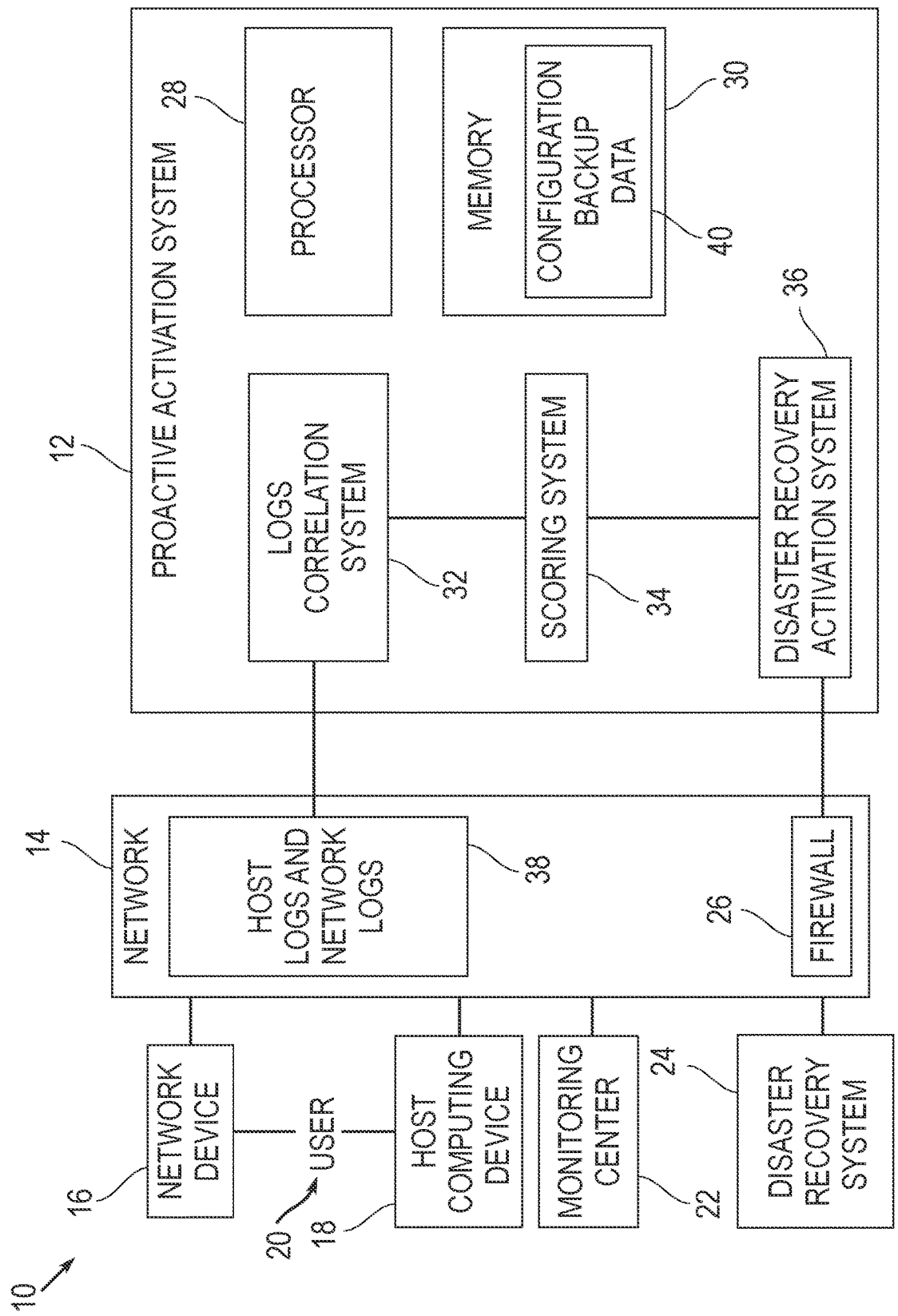
FIG. 1 is a schematic of a system, according to an embodiment.

Referring to FIG. 1, the system 10 includes a proactive activation system 12 operatively connected through a network 14 to a network device 16 or to a host computing device 18. Such devices 16, 18 are used as primary business sites by a user 20. The network 14 can be an intranet of a business. Alternatively, the network 14 can be an extranet of a business. In another alternative embodiment, the network 14 can be a hybrid intranet/extranet. In a further alternative embodiment, the network 14 can be the Internet. In still another alternative embodiment, the network 14 can be an intranet or extranet allowing access to the Internet. The network 14 can be implemented as a local area network (LAN). Alternatively, the network 14 can be implemented as a wide area network (WAN). In alternative embodiments, the network 14 can be any known network configuration.

In addition, a monitoring center 22 and a disaster recovery system 24 are operatively connected to the network 14. At least the disaster recovery system 24 is operatively connected to the proactive activation system 12 through a firewall 26 on the network 14. The firewall 26 can implement a set of firewall rules configured to control access of components through the network 14. For example, initially, the firewall rules are set to block the disaster recovery system 24 from accessing the primary sites such as the network device 16 and the host computing device 18. Accordingly, initially, the firewall rules normally isolate the disaster recovery system 24 from the primary site 16, 18.

The proactive activation system 12 includes a processor 28, a memory 30, a log correlation system 32, a scoring system 34, and a disaster recovery activation system 36. At least the log correlation system 32 is operatively connected to the network device 16 and the host computing device 18 through the network 14. As described below, the log correlation system 32 is configured to collect logs 38. The logs 38 include at least one of a host log and a network log received from the host computing device 18 and the network device 16, respectively. Such logs 38 can include system operational logs and security logs. In addition, the disaster recovery activation system 36 is operatively connected to the disaster recovery system 24 through the network 14. In particular, the disaster recovery activation system 36 is operatively connected to the disaster recovery system 24 through the firewall 26, as described below. The memory 30 is configured to store data including configuration backup data 40, as described below.

Figure 2:
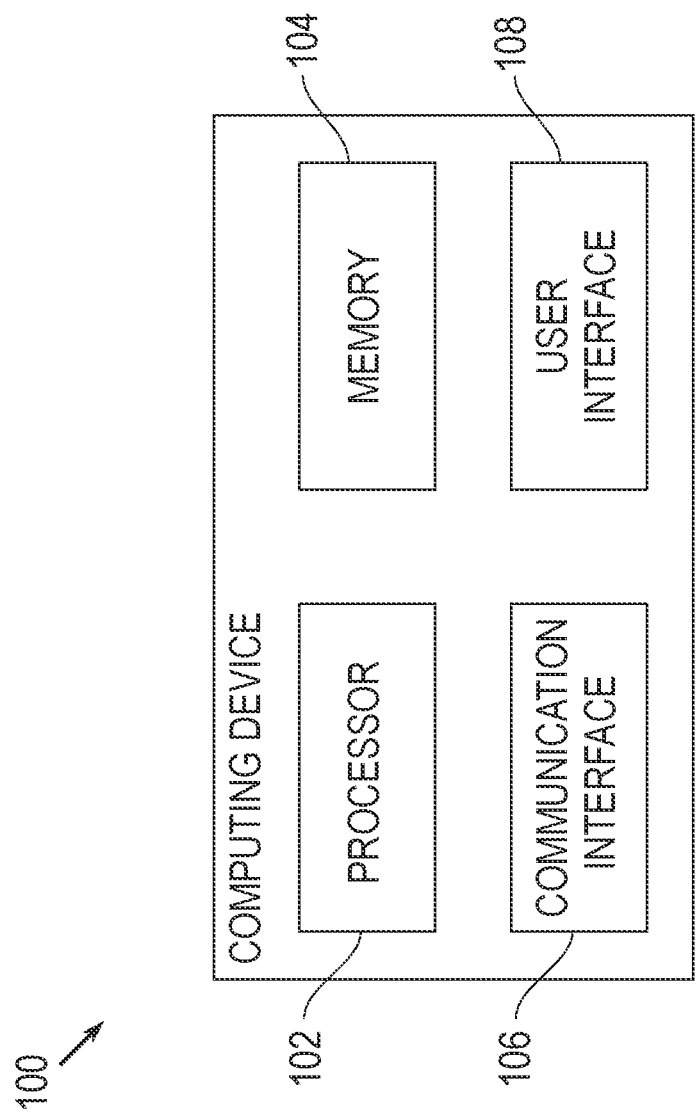
FIG. 2 is a schematic of a computing device used in the system of FIG. 1.

FIG. 2 illustrates a schematic of a computing device 100 including a processor 102 having code therein, a memory 104, and a communication interface 106. Optionally, the computing device 100 can include a user interface 108. The processor 102, the memory 104, the communication interface 106, and the user interface 108 can be operatively connected to each other via any known connections, such as a system bus, a network, etc. Any component or combination of components of the system 10 in FIG. 1 can be implemented by a respective computing device 100. For example, each of the proactive activation system 12, the network 14, the network device 16, the host computing device 18, the monitoring center 22, the disaster recovery system 24, the firewall 26, the log correlation system 32, the scoring system 34, and the disaster recovery activation system 36 shown in FIG. 1 can be implemented by a respective computing device 100 shown in FIG. 2 and described below.

It is to be understood that the computing device 100 can include different components. Alternatively, the computing device 100 can include additional components. In another alternative embodiment, some or all of the functions of a given component can instead be carried out by one or more different components. The computing device 100 can be implemented by a virtual computing device. Alternatively, the computing device 100 can be implemented by one or more computing resources in a cloud computing environment. Additionally, the computing device 100 can be implemented by a plurality of any known computing devices.

The processor 102 can include one or more general-purpose processors. Alternatively, the processor 102 can include one or more special-purpose processors. The processor 102 can be integrated in whole or in part with the memory 104, the communication interface 106, and the user interface 108. In another alternative embodiment, the processor 102 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 102 can include a plurality of processing elements configured to perform parallel processing. In a further alternative embodiment, the processor 102 can include a plurality of nodes or artificial neurons configured as an artificial neural network. The processor 102 can be configured to implement any known artificial neural network, including a convolutional neural network (CNN).

The memory 104 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 102 can be stored in a memory internal to the processor 102. The code can be instructions implemented in hardware. Alternatively, the code can be instructions implemented in software. The instructions can be machine-language instructions executable by the processor 102 to cause the computing device 100 to perform the functions of the computing device 100 described herein. Alternatively, the instructions can include script instructions executable by a script interpreter configured to cause the processor 102 and computing device 100 to execute the instructions specified in the script instructions. In another alternative embodiment, the instructions are executable by the processor 102 to cause the computing device 200 to execute an artificial neural network.

The memory 104 can store data in any known format, such as databases, data structures, data lakes, or network parameters of a neural network. The data can be stored in a table, a flat file, data in a filesystem, a heap file, a B+ tree, a hash table, or a hash bucket. The memory 104 can be implemented by any known memory, including random access memory (RAM), cache memory, register memory, or any other known memory device configured to store instructions or data for rapid access by the processor 102, including storage of instructions during execution.

The communication interface 106 can be any known device configured to perform the communication interface functions of the computing device 100 described herein. The communication interface 106 can implement wired communication between the computing device 100 and another entity. Alternatively, the communication interface 106 can implement wireless communication between the computing device 100 and another entity. The communication interface 106 can be implemented by an Ethernet, Wi-Fi, Bluetooth, or USB interface. The communication interface 106 can transmit and receive data over the network 14 and to other devices using any known communication link or communication protocol.

The user interface 108 can be any known device configured to perform user input and output functions. The user interface 108 can be configured to receive an input from a user. Alternatively, the user interface 108 can be configured to output information to the user. The user interface 108 can be a computer monitor, a television, a loudspeaker, a computer speaker, or any other known device operatively connected to the computing device 100 and configured to output information to the user. A user input can be received through the user interface 108 implementing a keyboard, a mouse, or any other known device operatively connected to the computing device 100 to input information from the user. Alternatively, the user interface 108 can be implemented by any known touchscreen. The computing device 100 can include a server, a personal computer, a laptop, a smartphone, or a tablet.

Figure 3:
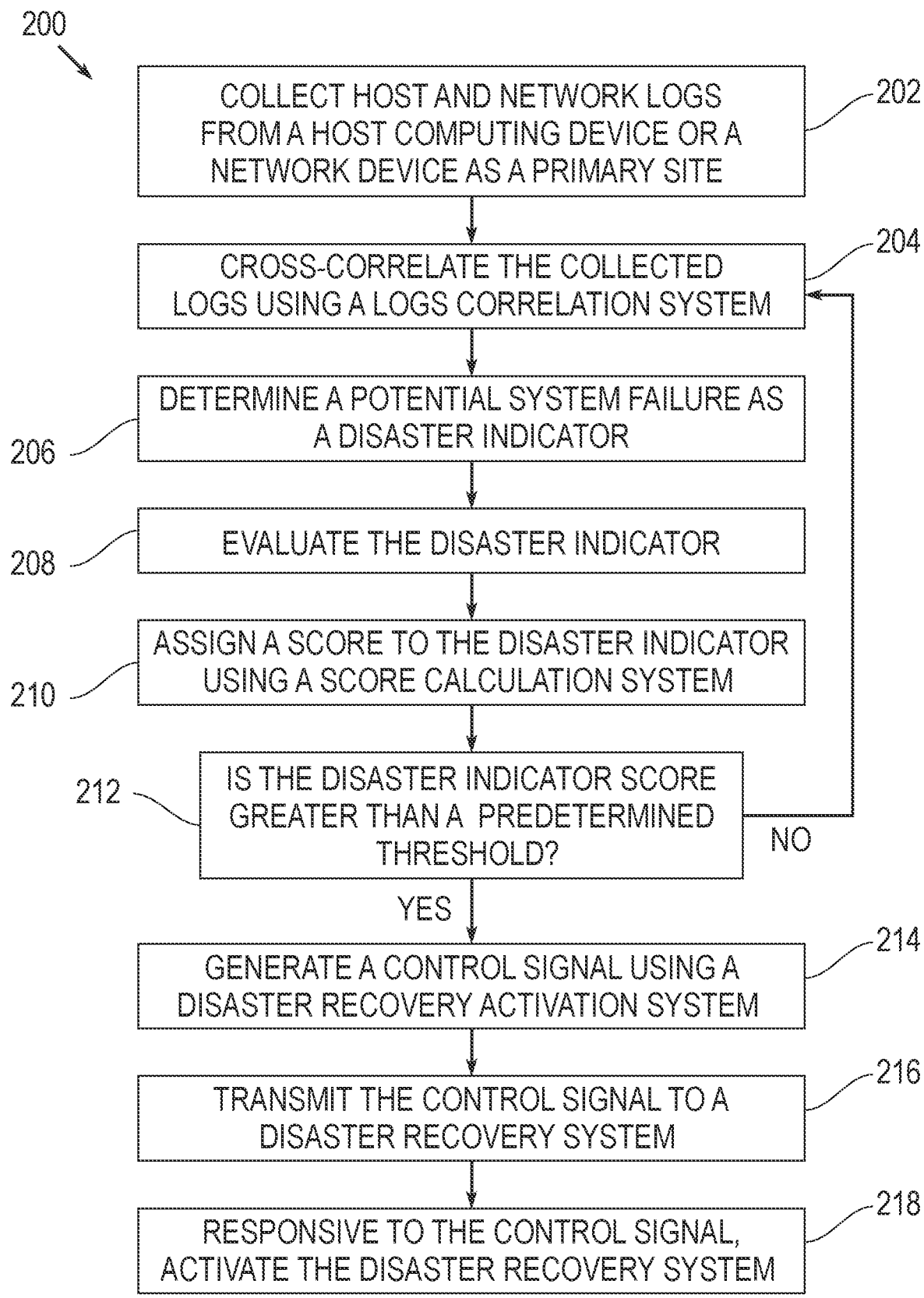
FIG. 3 is a flowchart of a method of operation of the system of FIG. 1.
Figure 4:
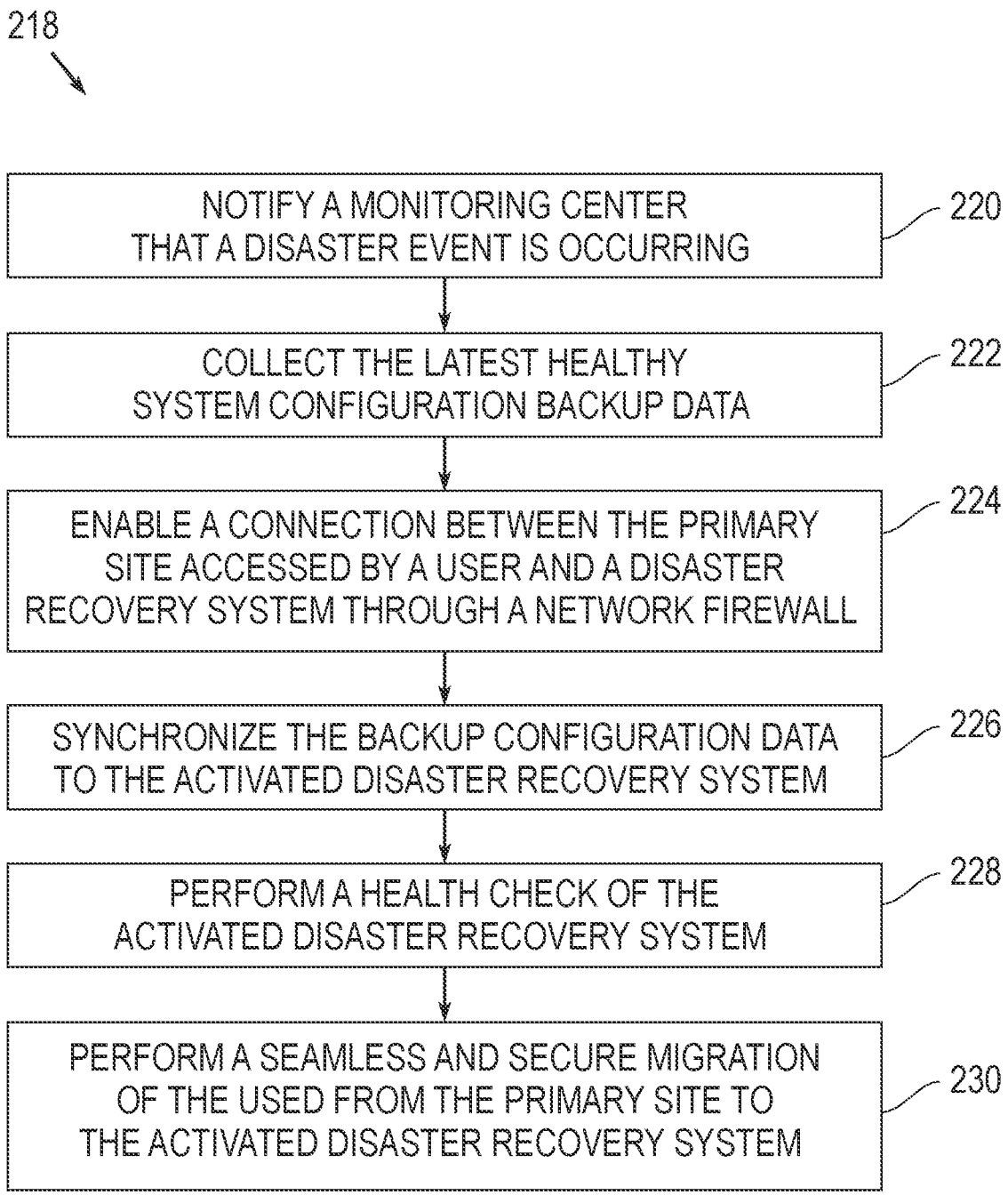
FIG. 4 is a flowchart of activation of a disaster recovery system.

Referring to FIGS. 3-4, in operation, the system 12 including the proactive activation system 12 performs the method 200. The method 200 includes collecting the logs 38 from a primary site in step 202. The logs 38 include the host logs and the network logs from the host computing device 18 and the network device 16, respectively. At least one of the network device 16 and the host computing device 18 can be configured to operate as a primary site of a business. The collecting of the logs 38 in step 202 is performed by the log correlation system 32 operatively connected to the primary site through the network 14. The method 200 then cross-correlates the collected logs 38 using the log correlation system 32 in step 204 to determine and identify any symptoms of a business system failure or service failure. The cross-correlation of the collected logs 38 is performed by comparing and cross-correlating the logs 38 with other integrated system logs within the same devices 16, 18 of the primary site. Examples of the collected logs 38 are firewall logs, switch logs, router logs, workstation logs, server logs, and systems health check logs. The method 200 then determines a potential system failure as at least one disaster indicator (DI) in step 206. A disaster indicator is a correlated event that has a potential for a system failure. The method 200 evaluates the at least one disaster indicator in step 208, and assigns a score to same using the score calculation system 34 in step 210. The score calculation system 34 applies a predetermined scoring method to measure the disaster potential from the at least one disaster indicator. The at least one disaster indicator is scored using a predetermined classification procedure, which results in an associated score representing the magnitude of the impact of the disaster and how fast the recovery from the disaster can take.

The predetermined scoring method executes multiple predetermined local scoring methods on various components 16, 18 of the primary site to determine multiple disaster indicator scores for each component 16, 18 of the primary site. The multiple disaster indicator scores are then weighted to determine a final disaster indicator score which captures any disaster qualifying event. For example, each disaster indicator is assigned a score between one and ten based on the frequency of occurrence and the magnitude of the impact of the disaster or system failure. The overall disaster indicator (DI) weights are also between one and ten, and are predefined based on criticality and tier of the impacted system. The DI weights and indicator scores are customizable based on the network owner, and can be modified by a system administrator.

The final score (DI) is calculated by summing up the score of each applicable indicator, with the sum multiplied by an impacted system weight as per the below formula:

$$DI = \left[\sum_{i=1}^{N} (\text{Indicator}_i \text{ Score})\right] \times (\text{Impacted System Weight})$$

Examples of scores are shown in Table 1 below

TABLE 1

| INDICATOR | SCORE |
| --- | --- |
| Multiple login failures (frequency: high plus impact: low equals score: low) | 2 |
| System not reachable (frequency: low plus impact: high equals score: high) | 10 | and examples of weights are shown in Table 2 below.

TABLE 2

| IMPACTED SYSTEM TIER | WEIGHT |
| --- | --- |
| Tier 1 systems (example: an active directory) | 10 |
| Tier 2 systems (example: a ticketing system) | 5 |
| Tier 3 systems (example: community application) | 1 |

Using the example scores and weights above, in the case of multiple login failures and system unreachability of a Tier 1 system, $$DI = \sum_{i=1}^{2} ((2 + 10) \times 10) = 120.$$

The method 200 then checks whether the final disaster indicator score is greater than a predetermined threshold in step 212. The predetermined threshold can be set to a default value. Alternatively, a system administrator of the system 10 can adjust the predetermined threshold, depending on the nature of the business. For example, in the case that the system 10 is used in with a business in a field having high security, the predetermined threshold can be set to a low value to cause the system 10 to be sensitive to potential threats or disasters. The threshold can be defined or set to be any number, such as a default value which can be modified by a system administrator.

In the case that the disaster indicator score is not greater than a predetermined threshold in step 212, the method 200 loops back to perform step 204. Otherwise, in the case that the disaster indicator score is greater than a predetermined threshold in step 212, the disaster indicator is positive, and the method 200 proceeds to generate a control signal in step 214 using the disaster recovery activation system 36. For the above example values resulting in a final DI score of 120, the threshold can be any numerical value which can be less than 120. For example, the threshold can be set to 100. Accordingly, with the above example values, the final DI score of 120, being greater than 100, generates an alert to trigger the generation of the control signal in step 214. The disaster recovery activation system 36 transmits the control signal to the disaster recovery system 24 through the network 14 in step 216. The disaster recovery system 24 is responsive to the control signal to activate the disaster recovery system 24 in step 218. The activation of the disaster recovery system 24 implements actions contained in a predetermined disaster recovery plan (DRP) of the business.

Referring to FIG. 4, step 218 is described in greater detail. The step 218 includes the proactive activation system 12 notifying the monitoring center 22 that a disaster event is occurring in step 220. The proactive activation system 12 then collects the latest healthy system configuration backup data 40 in step 222. The collected configuration backup data 40 is collected and stored in the memory 30. The proactive activation system 12 then enables a connection between the primary site 16, 18 accessed by a user 20 and the disaster recovery system 24 through the network firewall 26 in step 224. The proactive activation system 12 synchronizes or pushes the backup configuration data 40 to the activated disaster recovery system 24 in step 226. The proactive activation system 12 further performs a health check of the activated disaster recovery system 24 in step 228. The proactive activation system 12 then performs a seamless and secure migration of the user 20 from the primary site 16, 18 to the activated disaster recovery system 24 in step 230.

Accordingly, centralized checks of the logs 38 and the scoring, as described above, are performed by the proactive activation system 12. Such centralized checks are empowered by data analytics. By using such centralized checks, the proactive activation of the disaster recovery system 24 guarantees business continuity and minimum downtime through the seamless activation and migration of user services to a health-validated disaster recovery system 24.

Portions of the methods described herein can be performed by software or firmware in machine readable form on a tangible storage medium. The storage medium can be non-transitory. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including." "comprising." "having," "containing." "involving." and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method, comprising:
   providing a proactive activation system separate from a disaster recovery system;
   determining, using the proactive activation system, whether to activate the disaster recovery system separate from the proactive activation system, including:
   collecting logs from a computing device used in a business by a user;
   comparing and cross-correlating all of the collected logs;
   determining a potential system failure as a disaster indicator from all of the compared and cross-correlated collected logs;
   assigning a score to the disaster indicator;

in the case of the disaster indicator score being less than or equal to a predetermined threshold, continuing the cross-correlating of all of the collected logs;

in the case of the disaster indicator score being greater than the predetermined threshold, generating a control signal; and in the case of the disaster indicator score being greater than the predetermined threshold, transmitting the control signal to the separate disaster recovery system;

receiving the control signal at the separate disaster recovery system;

responsive to the received control signal, activating the disaster recovery system; and operating the activated disaster recovery system to migrate the user to the activated disaster recovery system.

2. The method of claim 1, wherein the computing device is a host computing device, and
wherein the collected logs are host logs.

3. The method of claim 1, wherein the computing device is a network device, and
wherein the collected logs are network logs.

4. The method of claim 1, wherein the activating of the disaster recovery system includes notifying a monitoring center that a disaster event is occurring.

5. The method of claim 1, wherein the activating of the disaster recovery system includes performing a health check of the activated disaster recovery system.

6. The method of claim 1, wherein the activating of the disaster recovery system includes collecting latest healthy system configuration backup data.

7. The method of claim 6, further comprising storing the collected latest healthy system configuration backup data in a memory.

8. The method of claim 6, wherein the activating of the disaster recovery system further comprises:
enabling a connection between the computing device and the activated disaster recovery system; and
synchronizing the configuration backup data to the activated disaster recovery system;
wherein migrating the user includes migrating the user from the computing device to the activated disaster recovery system.

9. A proactive activation system, comprising:
a log correlation system configured to collect logs from a computing device used in a business by a user, to compare and cross-correlate all of the collected logs, and to determine a potential system failure as a disaster indicator from all of the compared and cross-correlated collected logs;
a scoring system configured to assign a score to the disaster indicator; and
a disaster recovery activation system operatively connected to and separate from a disaster recovery system, configured in the case of the disaster indicator score being less than or equal to a predetermined threshold, continuing the cross-correlating of all of the collected logs by the log correlation system, and configured, in the case of the disaster indicator score being greater than the predetermined threshold, to generate a control signal, and to transmit the control signal to the disaster recovery system,
wherein the disaster recovery system receives the transmitted control signal and, responsive to the received control signal, activates to perform a disaster recovery plan and migrates the user to the activated disaster recovery system.

10. The system of claim 9, wherein the disaster recovery activation system is operatively connected to the disaster recovery system through a network firewall.

11. The system of claim 9, wherein the activated disaster recovery system is configured to collect latest healthy system configuration backup data.

12. The system of claim 11, wherein the activated disaster recovery system is configured to synchronize the configuration backup data to the activated disaster recovery system, and migrates the user from the computing device to the activated disaster recovery system.

* * * * *